Figure 1:
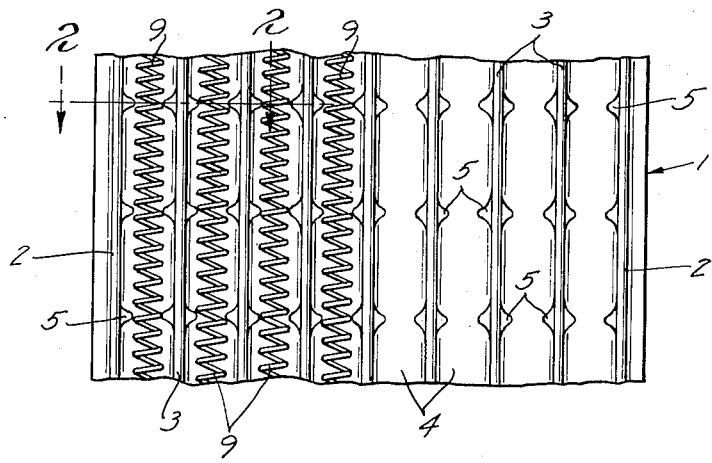

April 1, 1952  E. W. HAWKINSON  2,591,430
TIRE RETREADING MOLD
Filed May 8, 1950

Inventor
Earle W. Hawkinson
By his Attorneys
Merchant & Merchant

Patented Apr. 1, 1952

2,591,430

UNITED STATES PATENT OFFICE 2,591,430

TIRE RETREADING MOLD

Earle W. Hawkinson, Minneapolis, Minn., assignor to Paul E. Hawkinson Company, Minneapolis, Minn., a corporation of Minnesota Application May 8, 1950, Serial No. 160,692

3 Claims. (Cl. 18—18)

My invention relates to tire retreading molds and, more particularly, to molds of the type utilized in imbedding endless wire coils in the newly-applied tread rubber to impart skid-resistance thereto.

In tire retreading molds of the character above-described, it is essential that the wire coils be centered intermediate the channel-forming ribs between which the wire coils have been placed—in spaced relation to said ribs—in order that the wire coils or gripping claws eventually formed thereby do not work themselves out of the side of the endless rubber ribs formed by the channels. The primary object of my invention is the provision of novel means for automatically centering endless wire coils between a pair of endless channel-forming ribs.

Another object of my invention is the provision of novel and inexpensive means for the accomplishment of the above object, which will also impart a decorative design to the tire tread.

The above and still further objects of my invention will become apparent from the following detailed specification, appended claims, and attached drawings.

Figure 2:
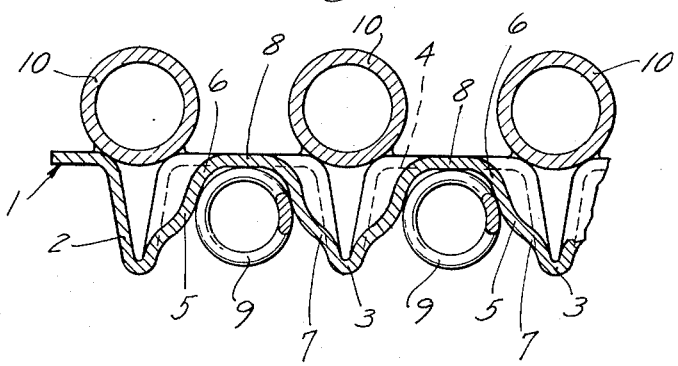

Referring to the drawings, wherein like characters indicate like parts throughout the several views:

Fig. 1 is a fragmentary view in plan of a conventional tire retreading mold constructed in accordance with my invention; and Fig. 2 is an enlarged fragmentary view in section, taken substantially on the line 2—2 of Fig. 1.

Referring with greater particularity to the drawings, the numeral I indicates, in its entirety, a tire retreading mold, preferably of the type disclosed and claimed in United States Patent No. 1,917,262. Mold I is substantially flat in cross section and includes a pair of circumferentially-extended confining flanges 2, one adjacent each side edge, and a plurality of laterally-spaced parallel circumferentially-extended tread design-forming ribs 3. As shown, the confining flanges 2 and ribs 3, define a plurality of laterally-spaced circumferentially-extended radially inwardly-opening channels 4, which, in a full circle mold, form endless rubber ribs in the newly-applied tread.

It will be noted that each of the ribs 3 and the confining flanges 2 is provided with a plurality of circumferentially-spaced wire coil-centering elements 5 which project laterally into the channels 4. Preferably and as shown, the centering elements 5 of any given rib 3 are opposed to the centering elements 5 of the cooperating channel-forming rib 3.

Preferably, the mold I is formed from a sheet metal band, all as more specifically set forth in the above referred-to United States Patent No. 1,917,262. The centering elements 5 are in the nature of integrally-formed teeth which taper from their bases 6 toward the radially innermost portion of the ribs 3 and terminate short thereof, as indicated by the numeral 7. Teeth 5 extend radially of the mold I and have a maximum width at the bases 8 of the channels 4 less than half the width of said channels 4.

When wire coils 9 are placed within the channels 4 of the mold I—one such method of insertion being disclosed in United States Patent No. 2,476,146, said coils 9 will center themselves intermediate the ribs 3 and in spaced relation thereto as the coils 9, at circumferentially-spaced points, contact the opposed teeth 5. The fact that the centering elements or teeth 5 have a maximum width adjacent the base 8 of the channels 4, and taper toward the radially innermost portion of the ribs 3, is important in that it permits use of wire coils 9 having slightly different diameters. The smaller coils 9, such as shown in the drawings, will be centered by engagement of the radially outermost portion of the opposed teeth 5, whereas the wire coils 9 of greater diameter will be centered by engagement of radially inner portions of the teeth, depending upon the exact size of the particular coil utilized. In any event, the coils 9 will be centered intermediate the ribs 3 —or confining flange 2, as the case may be.

A further benefit of the centering teeth 5 is that they will impart circumferentially-spaced notches in the rubber ribs formed in the channels 4. These notches not only produce a pleasing appearance and design to the tread but also impart non-skid qualities thereto. Secured to the peripheral outer surface of the mold I, by solder or the like, is a steam-conducting tube 10 for imparting vulcanizing heat thereto.

My invention has been thoroughly tested and found to be completely satisfactory for accomplishment of the above objects; and, while I have illustrated a commercial embodiment of the invention, it should be obvious that the same is capable of modification without departure from the spirit and scope of the invention as defined in the claims.

What I claim is:

1. A tire retreading mold including a plurality of pairs of substantially parallel circumferentially-extended ribs defining between each cooperating pair a radially inwardly-opening endless rider strip-forming channel, each of said ribs being provided with a plurality of circumferentially-spaced wire coil-centering teeth which project laterally thereof into said channels.

2. The structure defined in claim 1 in which the centering teeth in each rider strip-forming channel are in opposed relationship.

3. The structure defined in claim 1 in which said teeth have a maximum width at the base of the channels considerably less than half the width of the channels and which taper toward the radially innermost portion of the ribs but terminate short of said radially innermost portions.

EARLE W. HAWKINSON.

REFERENCES CITED

The following references are of record in the file of this patent:

UNITED STATES PATENTS

| Number | Name | Date |
|---|---|---|
| 1,740,616 | Midgley | Dec. 24, 1929 |
| 2,006,038 | Yamaki | June 25, 1935 |
| 2,121,956 | Eger | June 28, 1938 |
| 2,415,291 | Kreyer | Feb. 4, 1947 |
| 2,479,474 | Crooker | Aug. 16, 1949 |